US012632622B2

(12) United States Patent
Wen et al.

(10) Patent No.: US 12,632,622 B2
(45) Date of Patent: May 19, 2026

(54) AUTOMATIC GENERATION OF BILL OF PROCESS FROM DIGITAL TWIN USING EXPLORATORY SIMULATION

(71) Applicant: Siemens Aktiengesellschaft, Munich (DE)

(72) Inventors: Chengtao Wen, Redwood City, CA (US); Juan L. Aparicio Ojea, Moraga, CA (US); Ines Ugalde Diaz, Redwood City, CA (US); Gokul Narayanan Sathya Narayanan, Emeryville, CA (US); Eugen Solowjow, Berkeley, CA (US); Wei Xi Xia, Daly City, CA (US); Yash Shahapurkar, Berkeley, CA (US); Shashank Tamaskar, Mohali (IN); Heiko Claussen, Wayland, MA (US)

(73) Assignee: Siemens Aktiengesellschaft, Munich (DE)

( * ) Notice: Subject to any disclaimer, the term of this patent is extended or adjusted under 35 U.S.C. 154(b) by 1030 days.

(21) Appl. No.: 17/824,300

(22) Filed: May 25, 2022

(65) Prior Publication Data

US 2022/0391565 A1     Dec. 8, 2022

(30) Foreign Application Priority Data

Jun. 7, 2021     (EP) .................................... 21178050

(51) Int. Cl.
G06F 30/27          (2020.01)
G06F 119/18        (2020.01)

(52) U.S. Cl.
CPC .......... G06F 30/27 (2020.01); *G06F 2119/18* (2020.01)

(58) Field of Classification Search
CPC ............................. G06F 30/27; G06F 2119/18
See application file for complete search history.

(56) References Cited

U.S. PATENT DOCUMENTS 9,811,074 B1     11/2017 Aichele et al.
2021/0387350 A1*  12/2021 Oleynik .................. A47J 44/00

FOREIGN PATENT DOCUMENTS

CN          108628261 A        10/2018
CN          109719730 A         5/2019
(Continued)

OTHER PUBLICATIONS

Naboni, R., Kunic, A., Kramberger, A., & Schlette, C. (Jan. 2, 2021). Design, simulation and robotic assembly of reversible timber structures. Construction Robotics, 5(1), 13-22. (Year: 2021).*
(Continued)

*Primary Examiner* — Bijan Mapar

(57)          ABSTRACT

A method for automatically generating a bill of process in a manufacturing system comprising: receiving design information representative of a product to be produced; iteratively performing simulations of the manufacturing system; identifying manufacturing actions based on the simulations; optimizing the identified manufacturing actions to efficiently produce the product to be produced; generating, by the manufacturing system, a bill of process for producing the product. Simulations may be performed using a digital twin of the product being produced and a digital twin of the environment. System actions are optimized using a reinforcement learning technique to automatically produce a bill of process based on the design information of the product and task specifications.

14 Claims, 6 Drawing Sheets

(56)         References Cited

FOREIGN PATENT DOCUMENTS

| CN | 112784328 A | 5/2021 |
| WO | 2020167316 A1 | 8/2020 |

OTHER PUBLICATIONS

European Search Report corresponding to application No. 21178050.
7; 7 pages.

* cited by examiner

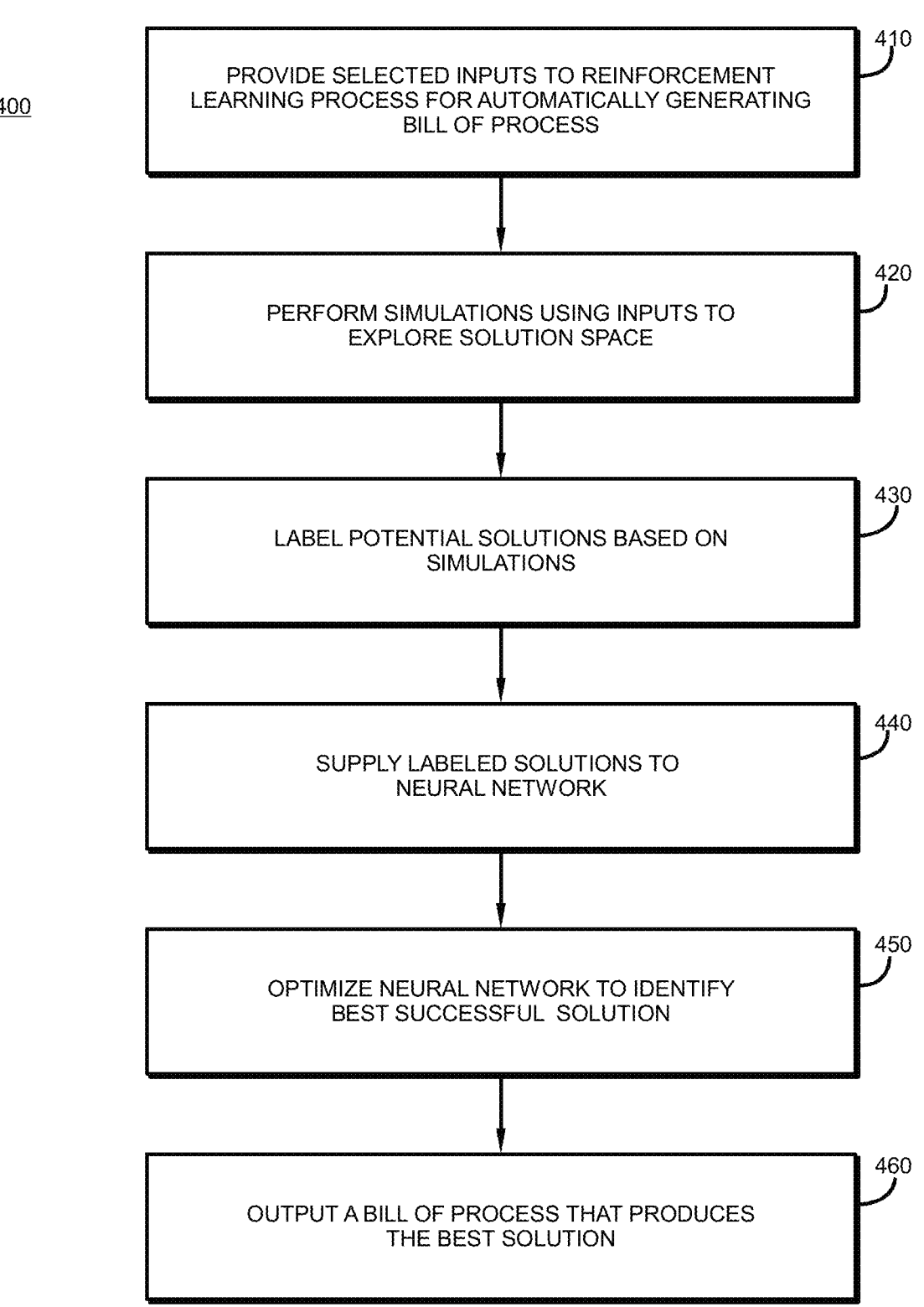

400

410 PROVIDE SELECTED INPUTS TO REINFORCEMENT LEARNING PROCESS FOR AUTOMATICALLY GENERATING BILL OF PROCESS

420 PERFORM SIMULATIONS USING INPUTS TO EXPLORE SOLUTION SPACE

430 LABEL POTENTIAL SOLUTIONS BASED ON SIMULATIONS

440 SUPPLY LABELED SOLUTIONS TO NEURAL NETWORK

450 OPTIMIZE NEURAL NETWORK TO IDENTIFY BEST SUCCESSFUL SOLUTION

460 OUTPUT A BILL OF PROCESS THAT PRODUCES THE BEST SOLUTION

*FIG. 4*

AUTOMATIC GENERATION OF BILL OF PROCESS FROM DIGITAL TWIN USING EXPLORATORY SIMULATION

TECHNICAL FIELD

This application relates to factory automation. More particularly, the application relates to autonomous manufacturing processes.

BACKGROUND

The 4th industrial revolution aims to include mass customization in the cost of mass production. This is achievable on account of autonomous machines that no longer have to be programmed with detailed instructions, such as robotic way points or manually taught paths, but instead automatically define their tasks using design information of the product to be produced. Such goals may be applied to assembly or packaging of a kit of items like cartridges, razor handles, creams, soaps etc., into blister packs based on their digital twin. Information (e.g., what objects to use, in which order the items need to be inserted, in which pose, how to pick them up and on which path they need to be inserted) are defined at the design stage of the product. Accordingly, the process should be based on the bill of material (BOM) and bill of process (BOP) and should not require additional programming for example, of a robotic handling system.

However, to realistically enable an autonomous system and effectively reduce the cost of producing a product it is important that generation of a sufficient BOM and BOP does not include a commensurate amount of high skilled and expensive resources versus conventional automated programming tasks such as those used by a robotic handling system by way of example. If the BOP requires a similar level of detail as coding the robotic handling system, then the requirements are merely transferred to another party or process but not actually automated. The BOM defines the components of a product and the BOP provides a definition of what should be produced. Automation of the BOM creation is included in available design tools and may be enhanced by methods including generative design. The BOP defines how a product is built and provides context for an autonomous system to define the execution steps/flow. This process is dependent on the BOM but other constraints such as the tools and machines that are available for manufacturing also contribute to considerations of preparing a workflow for producing the product.

BOP plays an important role in bringing product design to life. BOP will enable a factory with autonomous production units or modules (e.g. robots), that organize and optimize themselves, based on production orders to execute. Such an approach would create the flexibility and reactivity to production orders and market fluctuations, that enable producing smaller batches or mass customization affordably, improving the competitiveness of the industry. Methods for automating the generation of a BOP for autonomous manufacturing are therefore desired.

SUMMARY

According to an embodiment of the invention, disclosed is a method for automatically generating a BOP 620 in a manufacturing system 600 comprising: receiving design information 603 representative of a product 300 to be produced; iteratively performing simulations 420 of the manufacturing system; identifying manufacturing actions 612 based on the simulations; optimizing the identified manufacturing actions 619 to efficiently produce the product 300 to be produced; and generating, by the manufacturing system 600, a BOP 620 for producing the product.

According to other embodiments, the manufacturing system 600 comprises an autonomous machine (e.g. industrial robots) 520 for producing the product.

In other embodiments, a digital twin 601 of the product 300 and a digital twin 601 of the environment in which the manufacturing system 600 operates for performing the simulations 420 is received.

According to some embodiments, information relating to uncertainty 605 of the environment in which the manufacturing system 600 operates is received.

Other embodiments comprise optimizing the identified manufacturing actions 619 by processing received inputs in a reinforcement learning process 610.

In some embodiments, the BOP 620 comprises a list of components of the product 300 in order of assembly, optimized assembly sequence, and an associated motion planning for assembly of each component into the product 300 being produced. The bill of process 620 may comprise the list of components, methods of production, sequence of operations, and assembly methods etc. in order of assembly.

An embodiment including any of the previous embodiments, wherein the reinforcement learning process 610 includes a neural network 617 for establishing a policy 618 defining a next action 612 for an agent 611 which acts to produce the product 300.

According to some embodiments training the neural network 617 using simulation of the environment 601 and the product 300 occurs offline. In other embodiments, collecting manufacturing process data and training the neural network 617 during live production of the manufacturing system 600.

Some other embodiments comprise labelling a candidate solution for manufacturing the product as classification, e.g. integer variables successful or unsuccessful, as input to the neural network during training of the neural network. Labels can also be continuous values, e.g. production efficiency or cycle time.

In other embodiments of the invention the identified manufacturing actions 619 are optimized based on one or more of the following factors for example: forces due to friction; forces attributable to gripping; and forces related to moving a component of the product relative to an axis.

In additional embodiments, one or more of the factors of forces due to friction, forces attributable to gripping a component of the product, and forces related to moving a component of the object relative to an axis are ignored to speed up optimizing the identified manufacturing actions 619.

In some embodiments, optimizing the identified manufacturing actions 619 is based on applying a minimal amount of force on a component of the object and the shortening of path lengths used to position components of the product.

In other embodiments, the bill of process 620 comprises a list of components used to build the product in the order in which the components are assembled; and a list containing the motion planning of each component as that component is assembled to make the product.

BRIEF DESCRIPTION OF THE DRAWINGS

The foregoing and other aspects of the present invention are best understood from the following detailed description when read in connection with the accompanying drawings. To illustrating the invention, there is shown in the drawings embodiments that are presently preferred, it being understood, however, that the invention is not limited to the specific instrumentalities disclosed. Included in the drawings are the following Figures:

FIG. 4 is a process flow diagram for allowing a robotic control system to autonomously generate a bill of process according to aspects of embodiments described in this disclosure.

DETAILED DESCRIPTION

Figure 3:
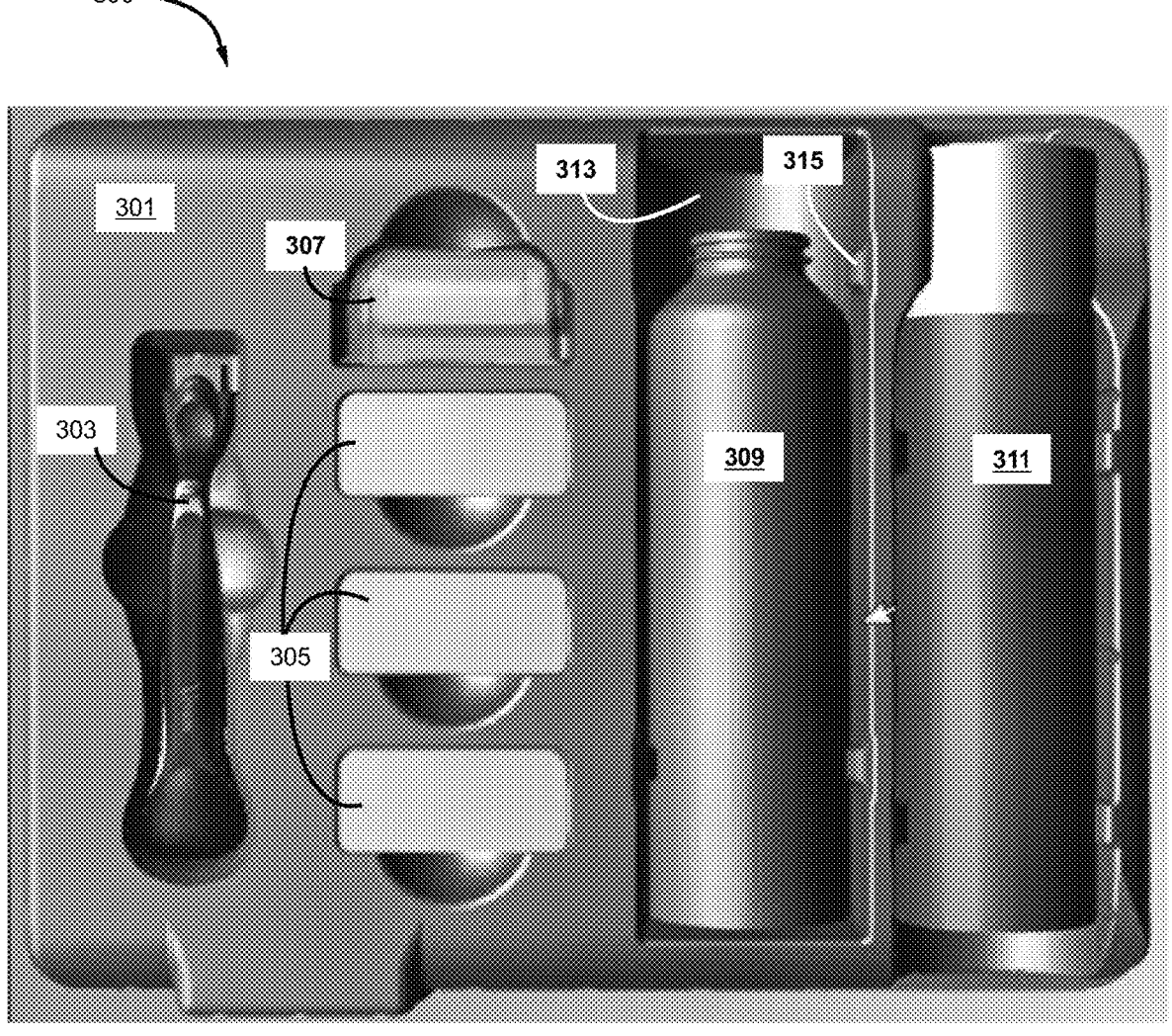
FIG. 3 is an illustration of a product that can be manufactured according to aspects of embodiments described in this disclosure.

Bill of processes are traditionally created in the design stage of a product and often utilized as assembly instructions to be used, for example by a human worker. Consider an example of assembling a kit of cartridges, razor handles, creams, soaps etc., into a blister pack as depicted in FIG. 3. These assembly instructions may be represented in an exploded view drawing and may be provided in printed instructions or electronically, such as in readable computer file such as a PDF file. The instructions instruct the worker to first apply glue, then place a coupon in a pre-defined position, then place a bottle such that artwork on the bottle is readable by a customer. Subsequently, the assembler is instructed to insert a razor handle, cartridges and covers in a suggested sequence. While this is adequate for instructing a human to do the task, this BOP presents challenges for a machine to interpret how to execute the tasks.

By way of example, consider the difficulty in a machine reading a PDF image. The machine needs to recognize the respective 3D parts, reason to determine meanings of arrows and written conditions specifying parts to assemble in which order. Additionally, the machine will infer missing or implicit information to determine if a component needs to be inserted in a special angle to snap into position. While these aspects may present an issue for a human, he/she could be taught how to build a first product and figure out later requirements by trial and error, in order to balance multiple performance metrices, e.g., accuracy and speed. However, this approach is not desirable for autonomous machines that are constrained by throughput requirements combined with the desire to limit skilled labor on the shop floor and minimize change over times between products.

Accordingly, current techniques using an autonomous machine require a manually created BOP provided in a file readable format including information about grasp points for each product (e.g., to ensure that the contact points of a robotic end effector align with the blister snap in features which is required to prevent unintended product rotation at high-speed insertions). Autonomous machines may also be equipped with models for object pose detection (e.g., that objects can be placed for readability of artwork). Furthermore, the autonomous machine must understand what object is inserted in which position and orientation with respect to the product coordinate system (e.g., blister pack) as well as which path to follow to prevent collisions that could cause damage to the products. Tool selection for properly performing the task must also be selected. This includes the ability to hand over products if required (e.g., to prevent physical slip of suction cups, etc.). Although creating this information requires significantly less effort than programming a robotic handling system, it nevertheless requires significant skill and time. For example, to program a complex kitting problem having flexibility based on vision and advanced robotic features could take a month or more's effort of a roboticist, while manually defining the models and parameters relating to the BOP may take an additional several hours.

Manual definition of the BOP presents challenges when considering the scenario of rapid changeovers. For example, if a system is required to manufacture different products every 4-5 hours it becomes infeasible to reprogram the robotic handling system between changeovers. Even for an autonomous system that doesn't require reprogramming but rather the creation of a BOP, the manual generation of this BOP becomes a roadblock because the generation of the BOP for a new product may take approximately several hours. When extrapolating this to fully customized production of lot size one, (e.g., at a rate of 50 parts per minute), it becomes clear that manual editing of the BOP will not scale as required. The process of assembling parts into a kit will be described herein with respect to FIGS. 1-3. These figures highlight the challenges and tasks which must be undertaken to define the assembly order, placement location, orientation, insertion path, insertion speed and other aspects that are encoded into a BOP.

Figure 1:
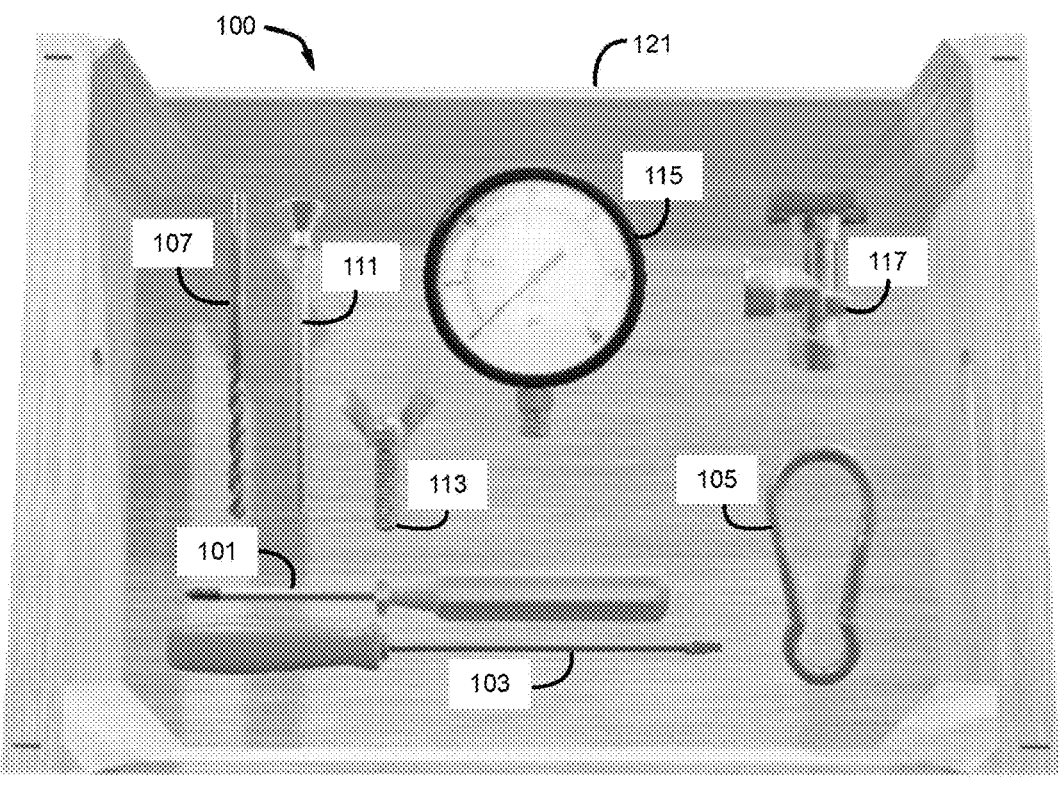
FIG. 1 is a depiction of a bin containing materials for production of a product according to aspects of embodiments described in this disclosure.

FIG. 1 shows a kit of parts 100 and tools required for an assembly. The location and orientation of each part is important for the next process step. The parts combine to produce a product offering. The kit 100 includes a tray 121 for holding parts and tools. The kit 100 includes tools such as a cross head screwdriver 101, a flat blade screwdriver 103 and a drill bit 107. The kit 100 further includes parts including a gauge 115, valve 117, screw 111, wing nut 113 and carabiner 105. Each tool may be manipulated by an autonomous machine for example using a robotic gripper or specially designed robot actuator. For example, a robotic arm may be configured with a rotational tool, and chuck for receiving drill bit 107. A robotic gripper may be configured for holding, positioning, and turning wing nut 113. Robotic arms may be further configured for manipulating parts like gauge 115 and valve 117. For autonomous handling of kit 100, the machine must learn the size and layout of tray 121 and recognize the tools and parts in the tray 121. To properly handle tools and parts in the kit 100, the autonomous machine must recognize the part or tool and identify its pose in the tray 121 relative to other parts or tools. The parts and tools may have predetermined positions within the kit 100, or the parts and tools may sit loose in the tray 121. In that case their relative poses may be random or overlapping.

Figure 2:
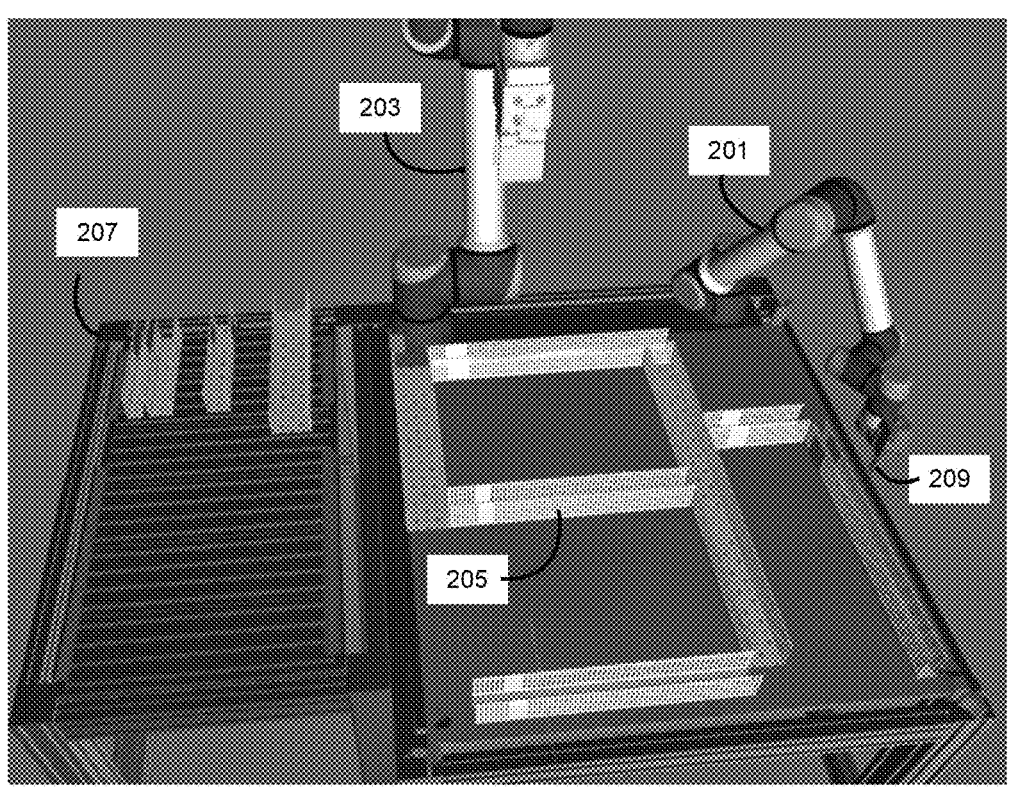
FIG. 2 is an isometric view of a manufacturing station including manufacturing robots according to aspects of embodiments described in this disclosure.

FIG. 2 is an illustration of an autonomous cabinet assembly which may be used to implement aspects of embodiments of this disclosure. For example, the autonomous cabinet assembly shown in FIG. 2 may be used for highly customized manufacturing such as producing products of lot size one. The assembly includes a first robotic arm 203 and a second robotic arm 201. A tool 209 may be associated with robotic arm 201 to perform work on a workpiece 205. Additional pieces 207 are provided that will be incorporated into workpiece 205. Robotic arm 203 may be equipped with an image sensor for providing machine vision over additional pieces 207 or workpiece 205. Information acquired through the image sensor may be used by an autonomous machine to determine processing steps, such as steps contained in a BOP for the product. Robotic arm 201 and robotic arm 203 may be configured to work in cooperation with one another to produce the desired product. For example, information acquired by robotic arm 203 through an image sensor may be used to inform the system on how and where to move robotic arm 201 and its associated tool 209. The location and orientation of each part is important for determining a subsequent process step. If pieces 207 have a variance in length for example due to a manual cutting process, the pieces 207 may not fit between other previously placed parts in workpiece 205. If pieces 207 need to be placed between others within a tight tolerance constraint the additional piece 207 may need to be inserted in a specific manner such as by tilting the part during insertion.

FIG. 3 is an illustration of a product 300 that may be assembled using a BOM and BOP according to embodiments described in this disclosure. The product 300 illustrated in FIG. 3 relates to a gift set relating to shaving. The product 300 includes a blister pack 301 that is produced from plastic. The blister pack 301 is molded to include cavities 313 for holding components of the gift set. The gift set includes a razor handle 303, three razor cartridges 305, a razor cover 307, a can of shaving gel or shave cream 311 and a promotional item 309, such as a water bottle. Each component is associated with a cavity 313 that is specifically designed to receive its associated component. Cavity 313 may be formed to include tabs 315 which are resilient and allow the component to be inserted into cavity 313 past tabs 315 which are urged outward as the component is inserted in its cavity 313. When the component is fully inserted in the cavity 313, tabs 315 will return to their original position and retain the component in position within the blister pack 301.

An important aspect of this invention seeks to automatically generate a BOP utilizing only the BOM, representing the product definition in the design phase. That is, computer aided design (CAD) or textured CAD information (if artwork dependent placement is required) of the different parts as well as the final product serve as the input for this step. The final product information implicitly provides the optimal locations and the orientations of the products while design information on the separate parts inform the required process steps and starting points.

In addition to the product information, it is also required to take physical producibility into account. That is, can a part be placed after another part without collisions or can the machine reach the required locations or follow the required paths given its physical constraints or potential collisions with other objects? Moreover, there may be other product dependent constraints to consider. For example, in some cases forces should be limited to a specific level. Another constraint may be that objects should not be moved around a specific axis to prevent spills or sheer forces which could result in dropping the product.

In an embodiment, the proposed solution utilizes a digital twin of the environment together with a digital twin of the product to simulate physics (e.g., frictions, forces, collisions) and to deploy a reinforcement learning motivated approach to explore the space of possibilities to create the product from its parts. The different successful options (no collisions with other objects and accessible paths for the kinematic) are then weighted using criteria such as minimal forces, cycle time etc. The reward function for the reinforcement learning approach may be the distance of the assembled parts in comparison to the associated object locations in the product design. A candidate solution is considered only if all parts reach their final location without collisions. The order the parts were assembled, as well as information on the path of the last centimeters distance before insertion are then stored as a BOP. To simplify the problem and therefore speed up convergence, certain aspects may be disregarded based on the task at hand. For example, one may disregard friction, forces and kinematic aspects and limit testing to collisions (including the end effector). In some cases, the part supply may be at a short distance (e.g., 10 cm) above its final location in the assembly. Therefore, the focus may not be on how to explicitly handle objects (pick, handover, rotate and transfer) but rather how and in which order to place them.

Flexible handling and assembly problems originate from the BOM and BOP of the product. While the BOM is the product definition and therefore results from the design process, the BOP describes how a product is produced. The process of generating a BOP may take hours and must be automated to enable efficient production of small lot sizes. Current approaches for generating a BOP require skilled (knowledge of the product and tools, e.g., robots and end effectors, used for assembly is required) but manual labor and are therefore costly and time prohibitive for flexible manufacturing.

According to aspects of embodiments described herein, reinforcement learning may be used to automatically explore the space of possibilities to assemble the product. The execution is penalized by information on collisions and forces which result from a physics simulation. The reward function is based on the distance of all assembled parts from the information in the design (BOM of the assembly). The process only considers solutions that are successful (no remaining distance and no collisions). The successful order of insertion policies/paths on the last centimeters may then be stored as BOP.

Current design tools focus only on the creation of a BOM and its associated assembly. The BOP must then be hand-coded by experienced experts. By automating the generation of a BOP, an improved design and production system is created. This represents an improvement to existing autonomous manufacturing systems that previously could not determine a practicable BOP on their own. With the technical problem of how to automatically generate a practicable BOP solved, these autonomous manufacturing systems have improved capabilities and can achieve greater potential for highly complex and customizable production. These improved capabilities provide opportunities in unexplored markets such as small lot sizes down to lot size one manufacturing.

Referring now to FIG. 4, a process 400 for automatically generating a bill of process by a control system for an autonomous robot is shown. Inputs for the process may include geometric information relating to the product to be produced. Geometric information may be provided in the form of CAD information generated by design tools as computer files during the design stage of the product. Further, information relating to the environment in which the autonomous robot is operating may be included as inputs to the process 400. In some embodiments, information pertaining to the product and/or the environment may be provided as a digital twin. A digital twin is a digital or computer-based copy of a real-world object or environment.

Given inputs or states experienced by the real-world object, the object's digital twin will create the same outputs or state changes that would be observed in the real-world counterpart for the same inputs.

Other inputs to process 400 may include information characterizing uncertainties in the operating environment. Uncertainties quantify small unpredictable time-varying conditions that may affect the overall production process. Accounting for uncertainty in the production process provides an improved solution when optimization is performed. By considering uncertainty, the optimized solution will account for slight unpredictable variations and achieve a more robust optimized solution. Another factor that may be provided as input is information relating to specifications unique to robotic tasks that may be performed by the robot in the manufacturing process. This additional information will guide the development of an optimized solution specifically developed according to the task being performed. Returning to process 400, the selected inputs are provided to a reinforcement learning process for automatically generating a bill of process 410.

Using the provided inputs, a simulation is performed to explore the solution space 420. Successful solutions are identified as a subset of the entire solution space. A successful solution is characterized by each action in the manufacturing being performed according to design, and that no collisions relating to the robot have occurred. In a kitting example as described in FIG. 3, a successful solution results in each component of the shaving kit being placed in its intended position with no collisions as each component was inserted into its final position.

As the solution space is explored, each potential solution is labeled according to the results of the simulations 430. Each labelled solution provides an input to a neural network which evaluates the solution regarding the quality of the solution 440.

Reinforcement learning is used to optimize the neural network. A reward function that favors solutions meeting favorable criteria adjusts the weights in the neural network to arrive at an optimal solution for meeting design requirements while exhibiting the most favorable characteristics 450 based on the criteria. For example, in the kitting example of FIG. 3, an optimal solution will obviously meet the minimum design requirements of having each component of the kit placed in the proper position with no collisions. In addition, the process may be evaluated to determine which successful solution(s) achieve the design requirements while minimizing the travel path of the robotic arm. As the neural network converges on an optimal solution, the output of the neural network outputs a bill of process for the best solution 460. The bill of process may include the order in which each component is placed in the kit, along with the paths the robotic arm uses to place each component in the kit.

The process 400 described above may take place in a computer processor that is part of the robot control system. The robot control system acts as in integral part of the industrial robot. Equipped with the ability to automatically generate a bill of process that is derived from the reinforcement learning process simulation, the improved computer control system provides a technical solution to the existing problem of providing instructions in the form of a bill of process that is consumable and executable by a machine. Prior solutions required substantial expert human input involving time requirements that frustrated the desire to provide quick switchover of manufacturing processes. The improved robot control system provides capabilities that make the goals of Industry 4.0 obtainable. For example, automatic generation of a bill of process will bring manufacturing closer to the goal of lot size one manufacturing.

Figure 5:
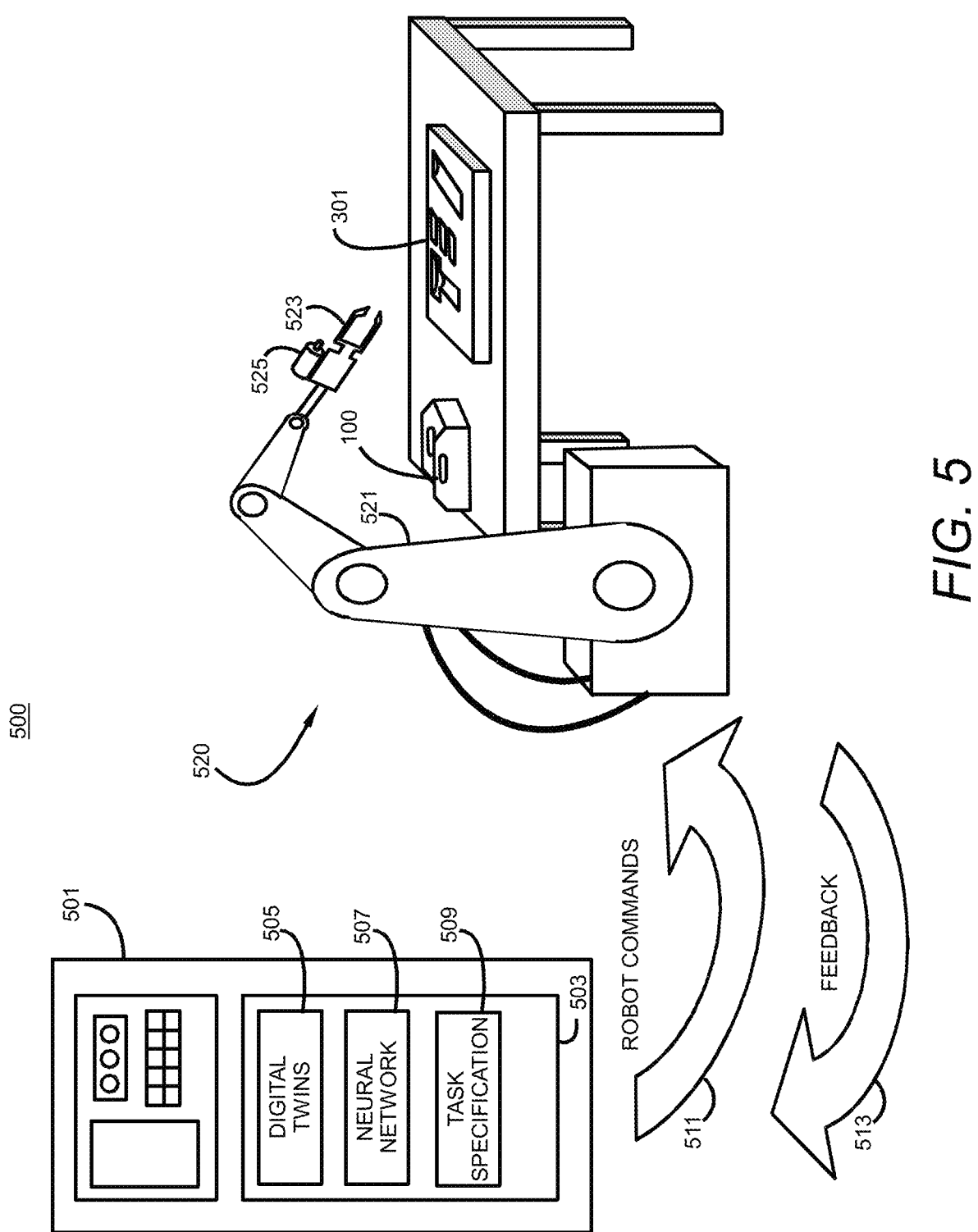
FIG. 5 is a diagram of an improved robot control system according to aspects of embodiments described in this disclosure.

FIG. 5 is an illustration of an improved robotic control system 500 for automatically generating a bill of process according to aspects of embodiments described in this disclosure. Industrial robot 520 includes a robotic arm 521. The robotic arm 521 includes several articulated joints. At the end of the robotic arm 521 a tool may be attached. For example, a gripper 523 may be attached to the end of the robotic arm 521. The industrial robot 520 may further be equipped with sensor 525 to assist the robot 520. Sensor 525 may be an imaging device for allowing the industrial robot 520 to perform machine vision. Other types of sensors 525 may be used. For example, force or torque sensors may be used to provide information on the operational state of the robotic arm 521. It will be recognized that many types of sensors 525 may be used to perform a variety of support functions for industrial robot 520. The industrial robot may be configured to use tool and parts tray 100. Parts or components from the parts and tool tray 100 may be picked by the industrial robot 520 and placed in the final product, such as blister pack 301.

The industrial robot 520 is controlled by a robot controller 501. The robot controller includes a computer processor and memory 503. The computer memory may include digital assets in the form of data and software. The digital assets may include digital twins 505, a neural network 507 and/or specifications for specialize tasks relating to a robot operating system 509. The robotic controller 501 generates robot commands 511 which are transmitted to the industrial robot 520 and cause the industrial robot 520 to perform tasks correlating the received robot commands 511. As the robot takes action, changes in state of the robot and its environment may be captured by sensor 525. Information relating to the state changes may be transmitted back to the robot controller 501 in the form of feedback 513.

According to embodiments of this invention, the computer controller 501 is improved to provide better control to robot 520. The computer processor and memory contain instructions that allow the robot controller 501 to automatically generate a bill of process using only the design information for the product. The design information is provided to a simulation using digital twins 505 of the product and the environment. The solution space for all candidate solutions for producing the product are explored. The candidate solutions are applied to reinforcement learning process in a neural network 507 to learn an optimal solution for producing the product. An optimal solution may provide a means to produce a product with no collisions by the robot 520 with either the product components or the surrounding environment of the robot 520. Other criteria may be used.

Figure 6:
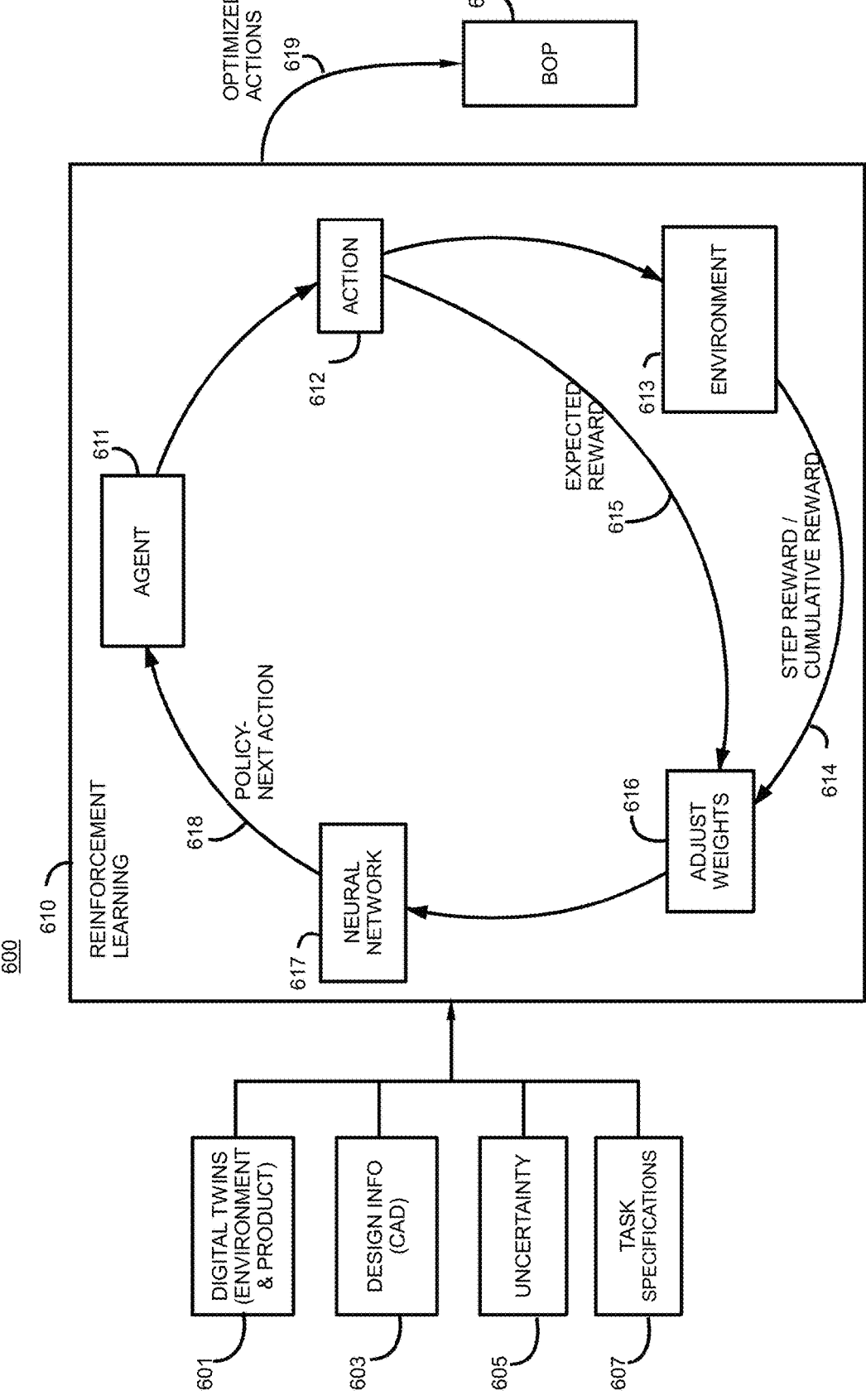
FIG. 6 is a block diagram of a reinforcement learning architecture for automatically generating a bill of process according to aspects of embodiments described in this disclosure.

FIG. 6 is a block diagram for an improved manufacturing system 600 for automatically generating a BOP using a reinforcement learning process according to aspects of embodiments described in this disclosure.

Inputs to the improved manufacturing system 600 include digital twins 601 relating to the product being produced and the environment, design information such as CAD files 603 for the product, an uncertainty factor 605 and detailed task specifications 607 relating to production tasks. The inputs are provided to a reinforcement learning process 610. Machine learning is implemented to optimize a solution. The optimized actions 619 are output in the form of an automatically generated BOP 620.

A reinforcement learning procedure 610 includes an agent 611. The agent 611 may be an industrial robot or an autonomous machine that performs actions 612 to produce the designed product. Each action 612 taken by the agent 611 influences the environment 613 in which the agent is operating. When the agent 611 takes an action 612, a change in one or more states of the environment 613 occurs. The goal of the reinforcement learning process 610 is for the agent 611 to take the optimal action 612 to efficiently produce the designed product. To that end, the reinforcement learning process 610 uses a neural network 617 that evaluates the ongoing actions 612 of agent 611. The neural network 617 evaluates the actions 612 of agent 611 and outputs a policy 618, which determines the next action to be taken by agent 611. With each action 612 of agent 611, an expected reward 615 for taking a given action 612 is compared to the actual reward 614 generated by simulating the action 612 with respect to the environment 613. The expected reward 615 is compared to the actual reward 614 to adjust the weights 616 of neural network 617 to update the policy 618. The neural network 617 is tuned to produce the optimal next action 612 for agent 611. An optimal action moves the agent 611 toward the goal of producing a product according to design specifications. When an optimal set of actions 619 that results in successful completion of the designed product is determined, the actions are compiled into a bill of process 620. The bill of process 620 is automatically generated by the control system of the robot serving as agent 611. In this way, the manufacturing system 600 represents an improvement in robotic control systems allowing for automatic generation of a bill of process 620. The improved manufacturing system 600 enables automatic generation of optimized actions 619, which progresses toward the goal of rapid adaptation for changeovers in manufacturing envisioned in Industry 4.0.

Figure 7:
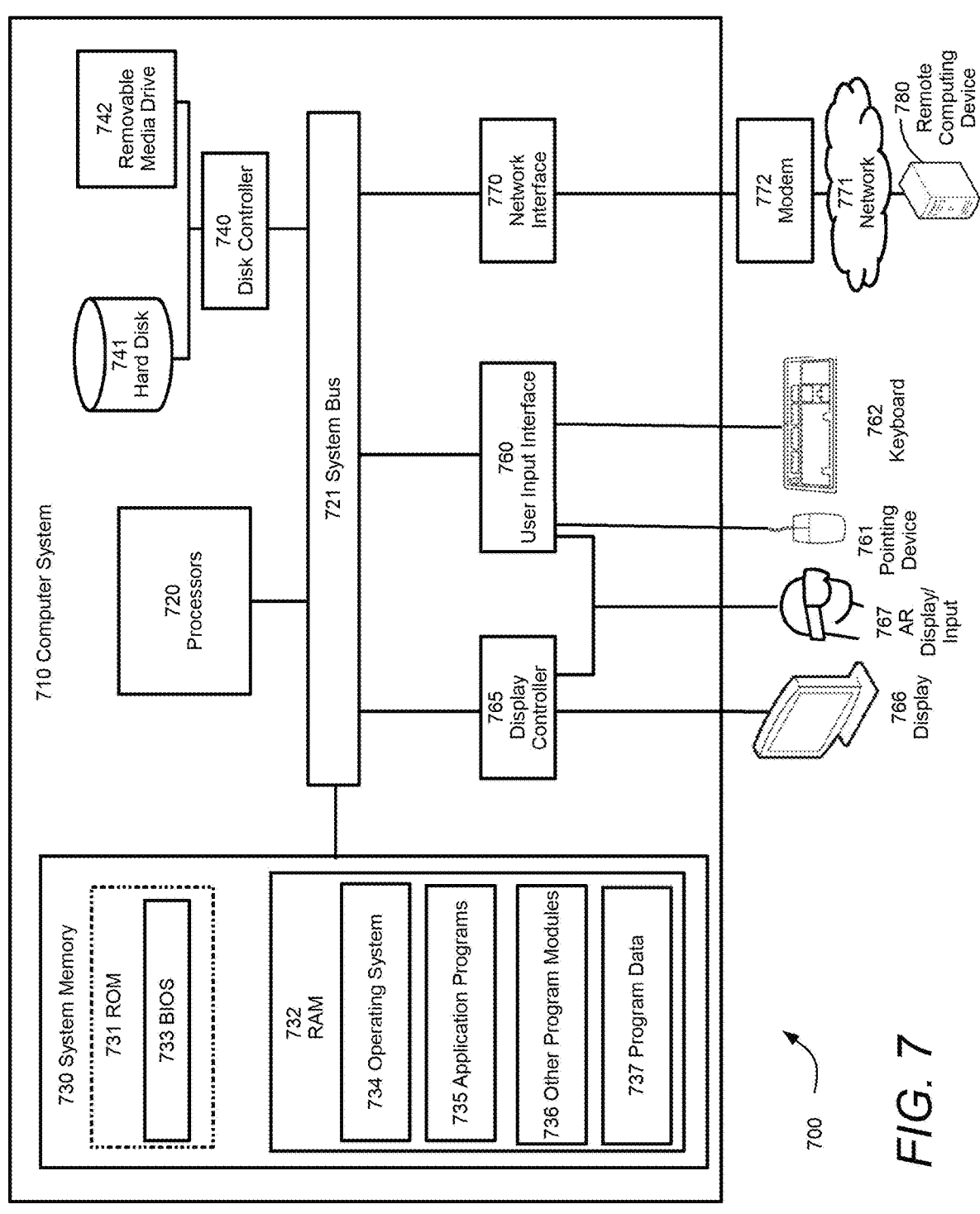
FIG. 7 is a block diagram of a computing system that may be used to implement certain aspects of embodiments described in this disclosure.

FIG. 7 illustrates an exemplary computing environment 700 within which embodiments of the invention may be implemented. Computers and computing environments, such as computer system 710 and computing environment 700, are known to those of skill in the art and thus are described briefly here.

As shown in FIG. 7, the computer system 710 may include a communication mechanism such as a system bus 721 or other communication mechanism for communicating information within the computer system 710. The computer system 710 further includes one or more processors 720 coupled with the system bus 721 for processing the information.

The processors 720 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting, or transmitting information for use by an executable procedure or an information device, and/or by routing the information to an output device. A processor may use or comprise the capabilities of a computer, controller, or microprocessor, for example, and be conditioned using executable instructions to perform special purpose functions not performed by a general-purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 7, the computer system 710 also includes a system memory 730 coupled to the system bus 721 for storing information and instructions to be executed by processors 720. The system memory 730 may include computer readable storage media in the form of volatile and/or nonvolatile memory, such as read only memory (ROM) 731 and/or random-access memory (RAM) 732. The RAM 732 may include other dynamic storage device(s) (e.g., dynamic RAM, static RAM, and synchronous DRAM). The ROM 731 may include other static storage device(s) (e.g., programmable ROM, erasable PROM, and electrically erasable PROM). In addition, the system memory 730 may be used for storing temporary variables or other intermediate information during the execution of instructions by the processors 720. A basic input/output system 733 (BIOS) containing the basic routines that help to transfer information between elements within computer system 710, such as during start-up, may be stored in the ROM 731. RAM 732 may contain data and/or program modules that are immediately accessible to and/or presently being operated on by the processors 720. System memory 730 may additionally include, for example, operating system 734, application programs 735, other program modules 736 and program data 737.

The computer system 710 also includes a disk controller 740 coupled to the system bus 721 to control one or more storage devices for storing information and instructions, such as a magnetic hard disk 741 and a removable media drive 742 (e.g., floppy disk drive, compact disc drive, tape drive, and/or solid state drive). Storage devices may be added to the computer system 710 using an appropriate device interface (e.g., a small computer system interface (SCSI), integrated device electronics (IDE), Universal Serial Bus (USB), or FireWire).

The computer system 710 may also include a display controller 765 coupled to the system bus 721 to control a display or monitor 766, such as a cathode ray tube (CRT) or liquid crystal display (LCD), for displaying information to a computer user. The computer system includes an input interface 760 and one or more input devices, such as a keyboard 762 and a pointing device 761, for interacting with a computer user and providing information to the processors 720. The pointing device 761, for example, may be a mouse, a light pen, a trackball, or a pointing stick for communicating direction information and command selections to the processors 720 and for controlling cursor movement on the display 766. The display 766 may provide a touch screen interface which allows input to supplement or replace the communication of direction information and command selections by the pointing device 761. In some embodiments, an augmented reality device 767 that is wearable by a user, may provide input/output functionality allowing a user to interact with both a physical and virtual world. The augmented reality device 767 is in communication with the display controller 765 and the user input interface 760 allowing a user to interact with virtual items generated in the augmented reality device 767 by the display controller 765. The user may also provide gestures that are detected by the augmented reality device 767 and transmitted to the user input interface 760 as input signals.

The computer system 710 may perform a portion or all of the processing steps of embodiments of the invention in response to the processors 720 executing one or more sequences of one or more instructions contained in a memory, such as the system memory 730. Such instructions may be read into the system memory 730 from another computer readable medium, such as a magnetic hard disk 741 or a removable media drive 742. The magnetic hard disk 741 may contain one or more datastores and data files used by embodiments of the present invention. Datastore contents and data files may be encrypted to improve security. The processors 720 may also be employed in a multi-processing arrangement to execute the one or more sequences of instructions contained in system memory 730. In alternative embodiments, hard-wired circuitry may be used in place of or in combination with software instructions. Thus, embodiments are not limited to any specific combination of hardware circuitry and software.

As stated above, the computer system 710 may include at least one computer readable medium or memory for holding instructions programmed according to embodiments of the invention and for containing data structures, tables, records, or other data described herein. The term "computer readable medium" as used herein refers to any medium that participates in providing instructions to the processors 720 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 741 or removable media drive 742. Non-limiting examples of volatile media include dynamic memory, such as system memory 730. Non-limiting examples of transmission media include coaxial cables, copper wire, and fiber optics, including the wires that make up the system bus 721. Transmission media may also take the form of acoustic or light waves, such as those generated during radio wave and infrared data communications.

The computing environment 700 may further include the computer system 710 operating in a networked environment using logical connections to one or more remote computers, such as remote computing device 780. Remote computing device 780 may be a personal computer (laptop or desktop), a mobile device, a server, a router, a network PC, a peer device or other common network node, and typically includes many or all of the elements described above relative to computer system 710. When used in a networking environment, computer system 710 may include modem 772 for establishing communications over a network 771, such as the Internet. Modem 772 may be connected to system bus 721 via user network interface 770, or via another appropriate mechanism.

Network 771 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 710 and other computers (e.g., remote computing device 780). The network 771 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite, or any other wireless connection methodology generally known in the art. Additionally, several networks may work alone or in communication with each other to facilitate communication in the network 771.

FIG. 3 Lot-1 kitting for e.g., blister-based gift packs. The order of inserting the parts is important as they may be placed on top of each other e.g., first glue, then a coupon and then a bottle. Also, the orientation of the products artwork is important for display. Moreover, the blisters have snap in features that constrain where the objects can be handled, can require insertions at particular angles or speed.

An executable application, as used herein, comprises code or machine-readable instructions for conditioning the processor to implement predetermined functions, such as those of an operating system, a context data acquisition system or other information processing system, for example, in response to user commands or inputs. An executable procedure is a segment of codes or machine-readable instructions, sub-routines, or other distinct section of codes or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user commands. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers, and processes can be implemented using hardware components, software components, and/or combinations thereof.

This disclosure describes embodiments for automatically generating a BOP from a BOM supported by design information for a product. These conclude an embodiment comprising a method for automatically generating a BOP 620 in a manufacturing system 600 comprising: receiving design information 603 representative of a product 300 to be produced; iteratively performing simulations 420 of the manufacturing system; identifying manufacturing actions 612 based on the simulations; optimizing the identified manufacturing actions 619 to efficiently produce the product 300 to be produced; and generating, by the manufacturing system 600, a bill of process 620 for producing the product.

An embodiment including any of the previous embodiments, wherein the manufacturing system 600 comprises an industrial robot 520 for producing the product.

An embodiment including any of the previous embodiments, further comprising receiving a digital twin 601 of the product 300 and a digital twin 601 of the environment in which the manufacturing system 600 operates for performing the simulations 420.

An embodiment including any of the previous embodiments, further comprising receiving information relating to uncertainty 605 of the environment in which the manufacturing system 600 operates.

An embodiment including any of the previous embodiments, further comprising optimizing the identified manufacturing actions 619 by processing received inputs in a reinforcement learning process 610.

An embodiment including any of the previous embodiments wherein the bill of process 620 comprises a list of components of the product 300 in order of assembly and an associated motion planning to assemble each component into the product 300 being produced.

An embodiment including any of the previous embodiments, wherein the bill of process 620 comprises the list of components in order of assembly.

An embodiment including any of the previous embodiments, wherein the reinforcement learning process 610 includes a neural network 617 for establishing a policy (618) defining a next action 612 for an agent 611 which acts to produce the product 300.

An embodiment including any of the previous embodiments, further comprising training the neural network 617 offline using simulation of the environment 601 and the product 300.

An embodiment including any of the previous embodiments, further comprising training the neural network 617 during live production of the manufacturing system 600.

An embodiment including any of the previous embodiments, further comprising labelling a candidate solution for manufacturing the product as inputs to the neural network during training of the neural network.

An embodiment including any of the previous embodiments, further comprising: optimizing the identified manufacturing actions 619 to compensate uncertain factors, e.g. forces due to friction; forces attributable to gripping; and forces related to moving a component of the product relative to an axis.

An embodiment including any of the previous embodiments, wherein one or more of the factors of forces due to friction, forces attributable to gripping a component of the product, and forces related to moving a component of the object relative to an axis is ignored to speed up optimizing the identified manufacturing actions 619.

An embodiment including any of the previous embodiments, wherein optimizing the identified manufacturing actions 619 is based on applying a minimal amount of force on a component of the object and the shortening of path lengths or cycle time used to position components of the product.

An embodiment including any of the previous embodiments, wherein the bill of process 620 comprises a list of components used to build the product in the order in which the components are assembled; and a list containing the motion planning of each component as that component is assembled to make the product.

What is claimed is:

1. A method for automatically generating a bill of process in a manufacturing system comprising:

receiving design information representative of a product to be produced;

receiving a digital twin relating to the product and a digital twin of an environment in which the manufacturing system operates;

using the digital twins for iteratively performing simulations of the manufacturing system;

receiving information relating to an uncertainty factor of the environment in which the manufacturing system operates, the uncertainty factor quantifying unpredictable time-varying conditions that affect a production process of the product to be produced;

evaluating manufacturing actions to determine successful solutions that achieve the design requirements according to the design information, the digital twin, and the information relating to the uncertainty factor of the environment;

identifying successful manufacturing actions based on the simulations;

optimizing the identified manufacturing actions to efficiently produce the product to be produced; and generating, by the manufacturing system, a bill of process for producing the product, wherein the bill of process causes an industrial robot to execute commands for producing the product.

2. The method according to claim 1, wherein the manufacturing system comprises an autonomous machine for producing the product.

3. The method according to claim 1 further comprising optimizing the identified manufacturing actions by processing received inputs in a reinforcement learning process.

4. The method according to claim 1 wherein the bill of process comprises a list of components of the product in order of assembly and associated motion planning to assemble each component to make the product being produced.

5. The method according to claim 1, wherein the bill of process comprises a list of components in order of assembly.

6. The method according to claim 3, wherein the reinforcement learning process includes a neural network for establishing a policy defining a next action for an agent which acts to produce the product.

7. The method according to claim 6, further comprising training the neural network offline using simulation of the environment and the product.

8. The method according to claim 6, further comprising training the neural network during live production of the manufacturing system.

9. The method according to claim 6, further comprising:

labelling a candidate solution for manufacturing the product with a discrete classification of successful or unsuccessful as input to the neural network during training of the neural network.

10. The method according to claim 6, further comprising:

labelling a candidate solution for manufacturing the product as a continuous regression as inputs to the neural network during training of the neural network.

11. The method according to claim 1, further comprising:

optimizing the identified manufacturing actions based on one or more of the following factors:

forces due to friction;

forces attributable to gripping;

forces related to moving a component of the product relative to an axis; and camera pose estimation errors.

12. The method of claim 11, wherein one or more of the factors of forces due to friction, forces attributable to gripping a component of the product, and forces related to moving a component of the product relative to an axis is ignored to speed up optimizing the identified manufacturing actions.

13. The method according to claim 1, wherein optimizing the identified manufacturing actions is based on applying a minimal amount of force on a component of the product and a shortening of cycle time used to position components of the product.

14. The method according to claim 1, wherein the bill of process comprises:

a list of components used to build the product in an order in which the components are assembled; and a list containing a motion planning of each component as that component is assembled to make a product.

* * * * *